L. LARSEN.
ELECTROMAGNET.
APPLICATION FILED OCT. 29, 1918.
1,399,350.
Patented Dec. 6, 1921.
2 SHEETS—SHEET 1.
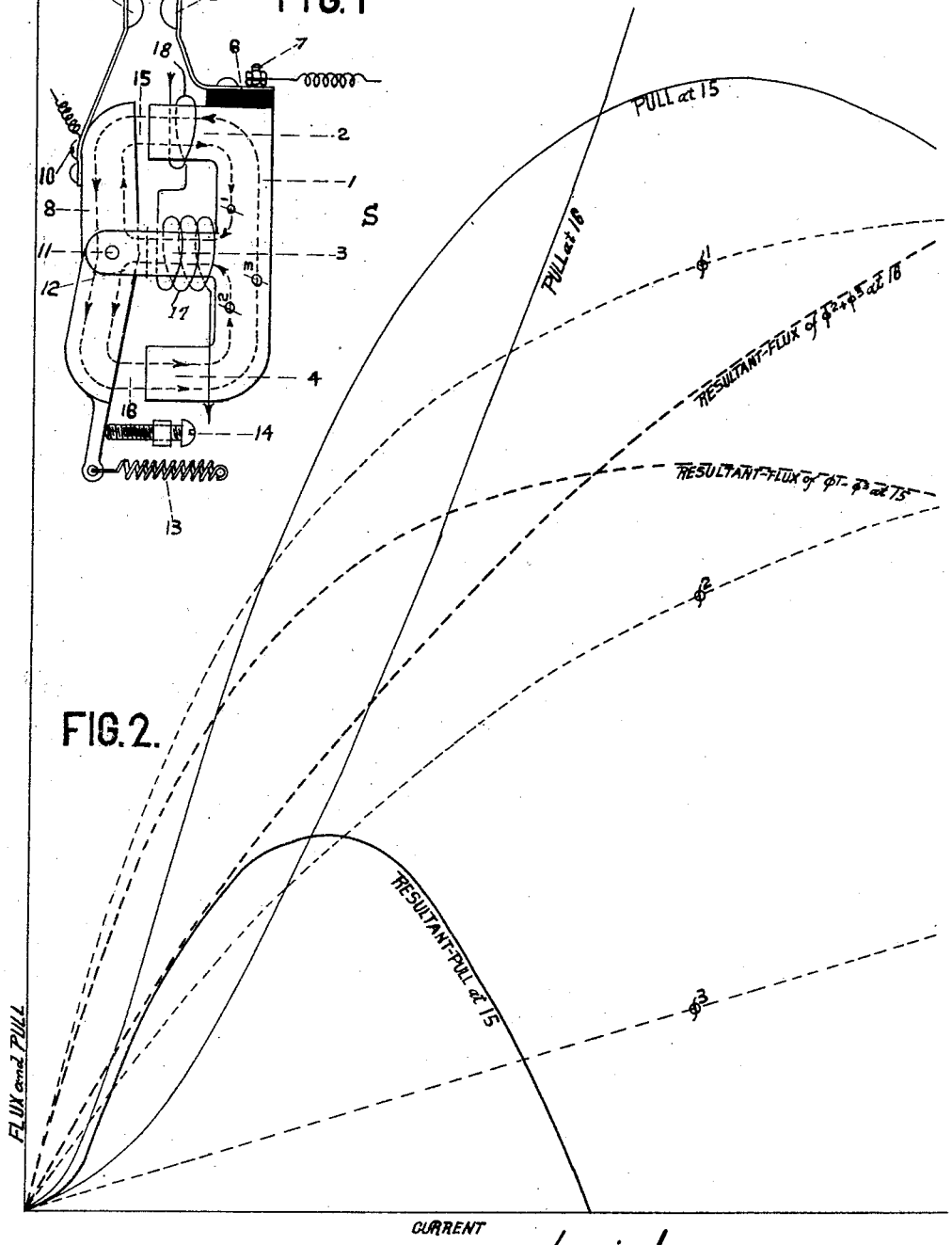

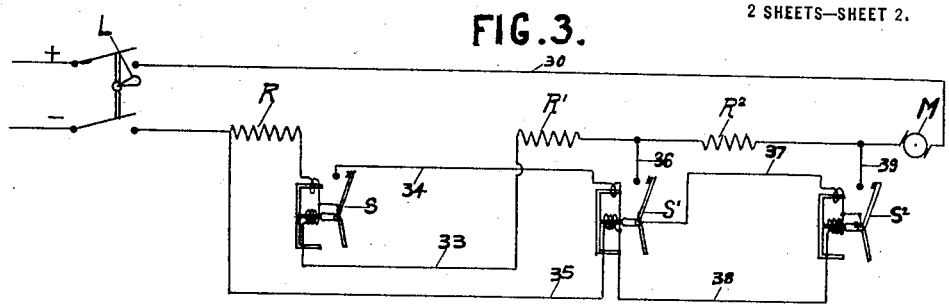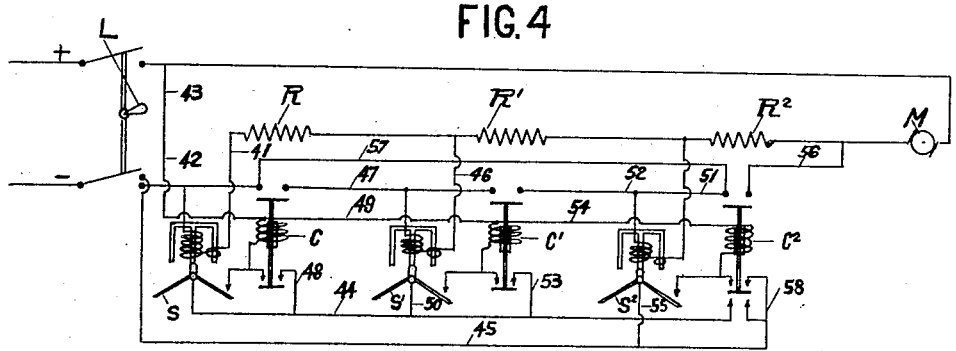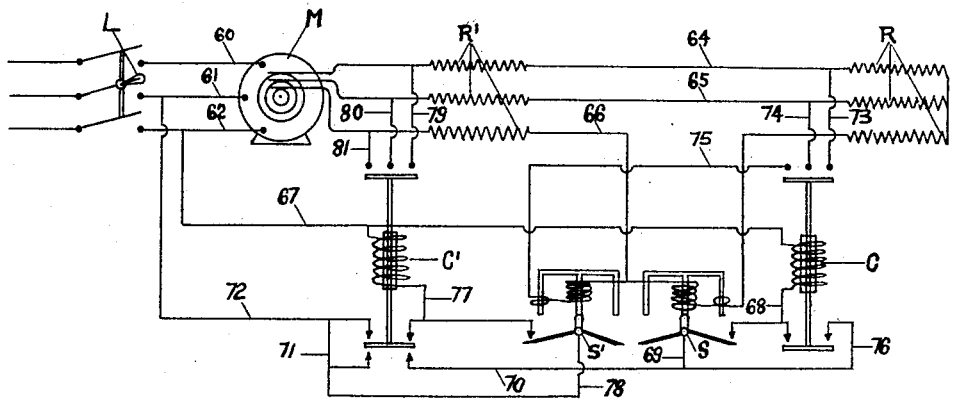

UNITED STATES PATENT OFFICE.

LOUIS LARSEN, OF BROOKLYN, NEW YORK, ASSIGNOR TO SUNDH ELECTRIC COMPANY, OF NEW YORK, N. Y., A CORPORATION OF NEW YORK.

ELECTROMAGNET.

1,399,350.   Specification of Letters Patent.   Patented Dec. 6, 1921.

Original application filed January 2, 1918, Serial No. 209,342. Divided and this application filed October 29, 1918. Serial No. 260,102.

*To all whom it may concern:*

Be it known that I, LOUIS LARSEN, a citizen of the United States, residing in the city of New York, borough of Brooklyn, county of Kings, and State of New York, have invented a certain new and useful Electromagnet, of which the following is a specification.

My invention relates to an electromagnet of the type which is operative only when the exciting current which is supplied to its actuating coil falls within certain predetermined limits and which, because of such characteristics, has been principally employed for the operation of the switches of motor controllers where, their actuating coils being successively connected in series with the motor, the switches will remain open or inoperative so long as the current to the motor is above the predetermined safe value and thus provide a so-called current-limit system of control responsive to the electrical condition of the motor.

As heretofore constructed, the magnets of these switches have been actuated by a single series wound coil and the magnetic circuit, which includes the usual operative or pulling-in air-gap between one pole of the fixed magnetic member and one end either of a reciprocating core or of a pivoted armature and a substantially closed magnetic path from the opposite pole of the fixed magnetic member back to the movable core or armature, is provided with an additional return path or by-pass across an opposing or holding-out air-gap maintained between the pole of the fixed magnetic member and the end of the core or an arm of the pivoted armature opposite that at the pulling-in air-gap. The closed or main branch of the return magnetic circuit in effect short circuits the by-pass across the second or holding-out air-gap, and the parts are so proportioned and adjusted that this main path will be saturated with lines of force by comparatively small currents while it will require a heavy current to saturate the by-pass. Thus, when excited by a current materially higher than that for which the magnet is constructed and adjusted, enough of the magnetic flux will be forced through the by-pass and across the holding-out air-gap to prevent operation, but, as the current falls, a larger and larger proportion of the total flux, which is decreasing in all parts of the magnetic circuit, will be carried over the shorter closed path until, the current having fallen within the limits predetermined, the weakening flux across the pulling-in air-gap will overcome the more rapidly reduced flux across the holding-out air-gap and actuate the switch.

Since the flux in the main and by-pass branches of the return magnetic circuit of these switches is in the same direction substantially the sum of the flux in both is acting at the pulling-in air-gap and at all times exerts a force tending to close the switch, being prevented from doing so only when opposed by a greater force at the holding-out air-gap in the by-pass. Consequently, the magnet is not positive in its operation. The pulling-in force is always greater the higher the current, and, therefore, although it will be overcome and the switch will be held open with extreme heavy currents, as the current drops and nears its predetermined critical or pulling-in value the switch is liable to close too soon. This is especially true when an alternating current is used to excite the magnet; so much so, that it has never been found possible to use this type of switch commercially for the control of alternating current circuits.

The object of my present invention is to provide a current-limit magnet which is positive in its action and is equally reliable both with alternating and direct current excitation.

I have discovered that by the use on a suitably constructed and adjusted magnet frame of two or more coils, a main coil and one or two subsidiary or compensating coils, suitably wound and placed, I can produce magnetic fluxes in opposite directions across one air-gap and all in one direction across the other air-gap, which fluxes are so responsive to changes in the value of the exciting current, alternating or direct alike, as to give a predominating closing force at the pulling-in air-gap whenever the current is below a predetermined critical value and with currents above such critical value, the force at the pulling-in air-gap remaining substantially stationary or even decreasing while the opposing force rapidly increases with an increase of current, an increasingly predominating holding-out force at the holding-out air-gap. I have thus obtained a magnet which is positive in its action and which operates in substantially the same way with alternating as with direct currents and is entirely reliable with both.

In its preferred form, my improved magnet comprises, briefly stated, a substantially E-shaped stationary core having three horizontally projecting legs, an armature of slightly elbow shape which is pivoted centrally on the outer end of the middle leg of the core to rock at one end against the upper leg or pole-piece and at the other end against the lower leg or pole-piece of the core, a main coil which is mounted upon the middle leg of the core, and either a single compensating coil connected in series with the main coil and wound similarly, which is mounted upon the upper pole-piece, or, the equivalent of such a single coil, two coils which are connected in series with the main coil and with each other and are mounted one upon the upper and the other upon the lower pole-piece, the upper coil being wound in the same direction as the main coil and the lower coil oppositely to both. Both the core and the armature are, of course, laminated in the usual manner when the magnet is intended for use with alternating currents. The middle leg of the core is made of smaller cross-section than the other two legs, preferably of one-half the area of each, in order that this leg may become easily saturated by the flux created by the main coil mounted thereon and so prevent the flux created by the compensating coil or coils from readily flowing through this shorter or shunt path and forcing it from the upper to the lower pole-piece and across both air-gaps. Where a single compensating coil is used, on the upper leg or pulling-in pole of the core, the ampere turns of the main and of this compensating coil are preferably in the proportion of five for the former to one of the latter; and when two compensating coils are used the number of ampere turns given to the single coil is divided between the two. And, finally, the armature is so shaped and adjusted that, when the magnet is inoperative and in normal open position, there will be a relatively short pulling-in air-gap at the upper pole-piece and a somewhat longer holding-out air-gap at the bottom pole-piece. The proportions and adjustments of the several parts may be varied widely, but those above given are the ones which, at present, have been found to produce the best results.

The construction and performance of a switch operated by a magnet having the characteristics described, and also certain applications of the switch to control systems both for direct and for alternating current motors, are shown in the accompanying drawings, in which—

Figure 1 is a view of the switch in side elevation, the main coil and single compensating coil being shown diagrammatically for the sake of clearness and the flux paths indicated by dotted lines; Fig. 2, a diagram showing the characteristic flux and pull curves of the switch of Fig. 1 under varying exciting currents whether alternating or direct; Fig. 3, a diagram illustrating the application of the switch to a direct or single phase alternating current system of motor control; Fig. 4, a diagram illustrating a different application of the switch to a direct or single phase alternating current system of motor control; and Fig. 5, a diagram illustrating one application of the switch to a polyphase alternating current system of motor control.

The same reference characters indicate like parts throughout the several figures of the drawings.

Referring first to Fig. 1, S indicates the switch as a whole. The stationary magnetic core 1, having three horizontal legs 2, 3, and 4, is mounted upon the usual base of insulating material (not shown) or in any other suitable manner, and above it is mounted the stationary contact member 5 which, as shown, is secured to an insulating block 6 fixed to the top of the upper leg of the core and is provided with a binding post 7 by which it is connected with one terminal of the electric circuit which the switch is used to control. The armature 8, which carries at its upper end the coöperating movable contact 9 provided with a suitable binding screw 10 for connecting it to the other circuit terminal, is pivoted at 11 between two plates 12 (only one of which is shown) fixed to the opposite sides of the middle leg of the core. As here illustrated, the switch is moved to and normally held in open position by a spring 13 which draws the lower end of the armature back against an adjustable stop 14, which by its position determines the maximum length of the short pulling-in air-gap 15 at the upper, and the minimum length of the longer holding-out air-gap 16 at the bottom, of the magnet. This stop is preferably so adjusted as to give to the holding-out air-gap a length several—say, five—times that of the pulling-in air-gap, although, as stated, the proportionate length of the two may be varied widely. The main actuating coil 17, wound upon the middle leg 3 of the core, produces when energized an upward flux $\varphi^1$ across the pulling-in air-gap 15 and a downward flux $\varphi^2$ across the holding-out air-gap and has ampere turns—three hundred, for example—sufficient to easily saturate the middle leg of the core with comparatively small currents. The compensating coil 18, preferably of one-fifth the ampere turns of the main coil, is wound upon the upper pole-piece of the magnet so as to give a flux $\varphi^3$ across the upper or pulling-in air-gap in the opposite direction of the flux $\varphi^1$, and this flux, because of the saturation of the middle leg by the main coil, is for the most part forced down to the lower end of the magnet, across the holding-out air-gap in the same direction as the flux $\varphi^2$, and thence back to the upper end of the magnet.

Thus, the closing pull at the upper air-gap is produced by the resultant of the two opposite fluxes $\varphi^1$ and $\varphi^3$, that is to say, $\varphi^1 - \varphi^3$, while the holding-out pull at the lower air gap is produced by the sum of the coöperating fluxes $\varphi^2$ and $\varphi^3$, or $\varphi^2 + \varphi^3$. With currents in excess of the predetermined critical value, as appears from the characteristic curves (Fig. 2) given by both alternating and direct currents alike, the values of both fluxes $\varphi^2$ and $\varphi^3$ rise, because of the low flux densities due to the length of the lower air-gap, and give a resultant flux, and consequent holding-out pull, which increases rapidly with an increase of current; whereas, the closing pull at the upper air-gap, unlike that of the old series magnets in which the pulling-in air-gap is always made longer than the holding-out air-gap, remains practically stationary or even decreases in value, since the flux $\varphi^1$ does not rise materially and is opposed by the rising value of the flux $\varphi^3$. Hence, the higher the current, the more strongly is the switch held open and inoperative. As the current in the coils falls to and passes below the critical value, however, the situation changes. For and instant only the closing and holding-out pulls balance each other. Then, as the flux $\varphi^1$ dies down less rapidly than the opposing flux $\varphi^3$, the gradually weakening closing pull at the upper air-gap quickly rises in value above the more rapidly weakening fluxes and holding-out pull at the lower air-gap and closes the switch. The result is that the switch is positively and firmly closed whenever the current, whether alternating or direct, falls slightly below the value predetermined, but is positively prevented from operating by a current slightly in excess of such value and is more securely locked in inoperative position the heavier and more dangerous the current.

In Fig. 3, there is illustrated a system of control for either a direct or single phase alternating current motor in which three of my new electromagnetic switches S, S¹, S² are used as contactors to directly control as many sections of starting resistance R, R¹. R² in the armature circuit of the motor M. The operation of the controller in the starting of the motor is as follows: On closing the line switch L, current flows from the positive main over wire 30 to and through the motor and thence back to the negative main through all of the resistance and both coils of the switch S. The switch is held open so long as the current thus admitted to the motor is above the predetermined safe value, but, as the motor speeds up and generates counter-electromotive force, the current is reduced in volume and the switch is closed. Thereupon current flows from the motor back to the negative main through the resistance R² and R¹, over wire 33, through the main coil only and across the closed contacts of switch S, over wire 34, through both coils of switch S¹, and over wire 35, short-circuiting the resistance R and the compensating coil of switch S. The switch S¹, which in turn is held inoperative until the increased current admitted to the motor by the cutting out of the resistance has again been reduced by a further acceleration of the motor, on closing establishes a return circuit from the motor to the negative main which includes the resistance R², wire 36, closed contacts of switch S¹, wire 37, both coils of switch S², wire 38, main coil of switch S¹, and wire 35, thereby short-circuiting resistance R¹ and the compensating coil of switch S¹ and the main coil of switch S. Finally, switch S² closes, after being held open until the motor has sufficiently accelerated, and short-circuits the last section of resistance R² and its own compensating coil by establishing a return circuit from the motor by wire 39, closed contacts and main coil of switch S², wire 38, main coil of switch S¹, and wire 35 to the negative main.

As illustrated in Fig. 4, the switches are used as relays to control contactor switches which in turn short-circuit the sections of starting resistance. The successive circuits automatically established in the operation of the device, on the closing of the line switch L, are as follows: The first circuit includes wire 40, armature of motor M, resistances R², R¹, R, wire 41, both coils of switch S, and wire 42. This starts the motor with the three sections of resistance and both coils of relay S in series with its armature. When relay S, thus energized, becomes operative it closes a shunt circuit, from the positive to the negative main, by wire 43, magnet coil of contactor C, closed contacts of relay S, wire 44, normally closed lower contacts of contactor C², and wire 45, which actuates the contactor C. The closing of the upper contacts of this contactor short-circuits the resistance R and both coils of relay S by connecting resistance R¹ with the negative main by wire 46, both coils of relay S¹, and wire 47, while its lower contacts establish a new or holding circuit for its coil by connecting the lower end of the coil to wire 44 over wire 48. Relay S¹, being now energized, closes when conditions permit and places the magnet coil of contactor C¹ in the shunt circuit in parallel with the coil of contactor C by connecting wire 43 to wire 44 over wires 49 and 50. Contactor C¹ is thereupon actuated, its upper contacts short-circuiting resistance R¹ and both coils of relay S¹ over wire 51, through both coils of relay S², and over wire 52 to wire 47 and its lower contacts establishing a new holding circuit for its coil by connecting the lower end of the coil to wire 44 over wire 53. The closing of relay S², in turn, by connecting wire 49 to wire 45 over wires 54 and 55 and thereby placing the magnet coil of contactor C² in parallel with the coils of the two other contactors, causes the actuation of this third contactor, which, at its upper contacts, short-circuits the three resistances and both coils of the three relays over wires 56 and 57 and at its lower contacts opens the connection between wires 44 and 45 and thereby breaks the circuits through the coils of contactors C and C¹ and establishes a holding circuit for itself by connecting the lower end of the coil to wire 45 over wire 58. The motor has now been brought to a condition of full speed, with all of the resistance, the coils of the two contactors C and C¹, and both coils of the three relays cut out of circuit.

The switches are also used as relays in the controller illustrated in Fig. 5, for alternating currents only. The closing of the line switch L connects the three mains to the three wires 60, 61, 62 of the primary of the motor M, which starts the motor with resistances R and R¹ in each of the three wires 64, 65, 66 of its secondary or rotor circuit and with both coils of the relay S in series in the wire 66. When the relay S, thus energized, is permitted to close, it establishes a circuit, shunting two of the primary wires 62 and 61, which includes wire 67, coil of contactor C, wire 68, closed contacts of relay S, wires 69 and 70, the normally closed contacts on the lower side of the lower contact bar of contactor C¹, and wires 71 and 72. The contactor C is now actuated and its main contacts, in closing, connect together the three wires of the secondary circuit over the wires 73, 74, and 75, thus short-circuiting the resistance R and both coils of the relay S and connecting both coils of the relay S¹ in series with the wire 66, while its lower contacts establish a new holding circuit by connecting wire 68 to wire 70 over wire 76. Finally, the relay S¹ is actuated and places the coil of contactor C¹ in parallel with that of contactor C by connecting wire 67 to wire 72 over wires 77, 78, and 71 and thereby causes the actuation of contactor C¹, which, at its upper contacts, short-circuits resistance R¹ and both coils of relay S¹ by connecting together the wires of the secondary circuit over wires 79, 80, 81 and, at its lower contacts, opens the connection between wires 70 and 71, thereby cutting the coil of contactor C out of circuit, and establishes a new holding circuit for itself by connecting wire 77 directly to wire 72. This completes the operation of starting the motor.

While I have shown and described my invention as embodied in a specific type of electromagnet for actuating an electric switch and have illustrated the application of switch to alternating and direct current systems of motor control, it should be understood that I do not limit myself to any type of magnet or to the details of construction thereof or to any theory of operation, except as set forth in the annexed claims.

This application is a division of the application filed by me on January 2, 1918, Serial No. 209,842.

What I claim as new, and desire to secure by Letters Patent, is—

1. In a motor control system, the combination, with a motor having a plurality of resistances in its circuit, of a plurality of contactors controlling each a resistance, a plurality of current-limit relays controlling each a contactor, and actuating circuit connections for the relays and contactors whereby the first relay is actuated by current to the motor through all of the resistances, the actuation of each contactor to cut out a resistance both cuts out of circuit the relay by which it is controlled and establishes a new holding circuit for itself and, except in the case of the last contactor, also connects the actuating circuit of the relay controlling the next succeeding contactor with the motor circuit in series with the resistances then remaining therein and the last contactor cuts out the holding circuits of the preceding contactors.

2. In a motor control system, the combination with a motor having a plurality of resistances in its circuit, of a plurality of contactors each having a set of main contacts and a set of auxiliary contacts both normally biased to open position and the last contactor only of the series having an additional set of auxiliary contacts normally biased to closed position, a plurality of current-limit relays, and circuit connections for the relays and contactors whereby the first and each succeeding relay in turn is actuated by motor current and on actuation closes the actuating circuit of a contactor which, except in the case of the last contactor, includes therein the normally closed auxiliary contacts of the last contactor and each contactor on actuation by the closing of its main contacts short-circuits both a resistance in the motor circuit and the actuating circuit of the relay by which it is controlled and, except in the case of the last contactor, also connects the actuating circuit of the relay controlling the next succeeding contactor with the motor circuit and by the closing of its normally open auxiliary contacts establishes a holding circuit for itself and, in the case of the last contactor, by the opening of its normally closed auxiliary contacts opens the holding circuits of the preceding contactors.

3. In a control system for polyphase induction motors, the combination, with the motor and resistances in the secondary or rotor circuit, of a plurality of contactors controlling each a resistance in the wires of the secondary circuit, a plurality of current-limit relays, and circuit connections for the relays and contactors whereby the relays each except the first under control of a contactor are actuated by current in the secondary circuit and the contactors each under control of a relay are actuated by current outside of the secondary circuit and on actuation each contactor short-circuits the actuating circuit of its controlling relay and establishes a holding circuit for itself and the last contactor opens the holding circuits of all the preceding contactors.

LOUIS LARSEN.